United States Patent [19]

Luen

[11] Patent Number: 5,680,798
[45] Date of Patent: Oct. 28, 1997

[54] HANDLEBAR STEM ASSEMBLY AND FORK OF A BICYCLE HAVING EXPANDER NUT STRUCTURE

[75] Inventor: Chen Sheng Luen, Taichung, Taiwan

[73] Assignee: Dia-Compe, Taiwan Co., Ltd., Taiwan

[21] Appl. No.: 556,138

[22] Filed: Nov. 9, 1995

[51] Int. Cl.⁶ ............................................. B62K 21/12
[52] U.S. Cl. ...................... 74/551.1; 280/279; 403/370
[58] Field of Search .......................... 74/551.1–551.8; 280/279, 281.1; 403/370

[56] References Cited

U.S. PATENT DOCUMENTS

| | | |
|---|---|---|
| 681,325 | 8/1901 | Hullt . |
| 2,310,064 | 2/1943 | Conti . |
| 3,136,149 | 6/1964 | Klein, Jr. . |
| 3,260,535 | 7/1966 | Jaulmes . |
| 3,284,114 | 11/1966 | McCord, Jr. et al. . |
| 3,306,684 | 2/1967 | Klein, Jr. . |
| 3,831,979 | 8/1974 | Baginski ................ 280/279 |
| 3,942,822 | 3/1976 | Lewis . |
| 4,068,858 | 1/1978 | Harrison et al. ............ 280/279 X |
| 4,274,301 | 6/1981 | Katayama ................ 74/551.1 |
| 4,323,263 | 4/1982 | Cook et al. . |
| 4,340,238 | 7/1982 | Cabeza . |
| 4,410,197 | 10/1983 | St. Hillaire . |
| 4,466,629 | 8/1984 | Sinyard ................ 280/279 |
| 4,526,491 | 7/1985 | Pawsat . |
| 4,624,470 | 11/1986 | Love . |
| 4,653,768 | 3/1987 | Keys et al. . |
| 4,783,187 | 11/1988 | McMurtrey . |
| 4,794,815 | 1/1989 | Borromeo . |
| 5,002,297 | 3/1991 | Klein ........................... 280/279 |
| 5,085,063 | 2/1992 | Van Dyke et al. ............ 280/279 X |
| 5,095,770 | 3/1992 | Rader, III . |
| 5,197,349 | 3/1993 | Herman ........................ 74/551.1 |
| 5,201,242 | 4/1993 | Chi ............................... 75/551.1 |
| 5,273,301 | 12/1993 | Klein ........................... 280/279 |
| 5,540,457 | 7/1996 | Johnson ........................ 280/279 |

*Primary Examiner*—Vinh T. Luong
*Attorney, Agent, or Firm*—Christensen O'Connor Johnson & Kindness PLLC

[57] ABSTRACT

An improved assembled structure of a handlebar stem assembly and a fork of a bicycle wherein a handlebar stem assembly is inserted into a steer tube; the handlebar stem of the handlebar stem assembly is provided with a step which abuts against a pressure adjuster on a top end of the steer tube such that the pressure adjuster exerts a downward force to secure the upper bearing assembly in place; by relative movement between the cooperative tapered contact surfaces of the handlebar stem and tongue-shaped tube placed below the handlebar stem, the outer sides of the handlebar stem and the tongue-shaped tube abut against the inner wall of said steer tube in order to secure said handlebar stem to steer tube and obtain axial and radial positioning of the handlebar stem. The handlebar stem can be provided with external threads rather than a step for being engaged with a locking nut which acts as a step for abutting against the pressure adjuster.

9 Claims, 5 Drawing Sheets

5,680,798

HANDLEBAR STEM ASSEMBLY AND FORK OF A BICYCLE HAVING EXPANDER NUT STRUCTURE

FIELD OF THE INVENTION

This invention relates to an improved assembled structure of a handlebar stem assembly and a fork of a bicycle wherein a steer tube is not provided with threads and a handlebar stem is inserted into the steer tube and has a step for abutting against a pressure adjuster assembly. The pressure adjuster assembly includes a compression ring having a gap and being composed of a upper and a lower tapered faces wherein the upper tapered surface cooperates with a tapered surface of the pressure adjuster to produce an appropriate pressure to press the lower tapered surface downward to contact with a tapered surface of a race of an upper bearing assembly having the same slanting angle as that of the lower tapered surface in order to eliminate undesired gap and ensure the ball bearings to rotate smoothly.

According to the structure of this invention, the number of thread machining and welding spots can be decreased in order to decrease manufacturing cost, increase security, simplify assembling procedure and decrease the number of necessary tools.

BACKGROUND OF THE INVENTION

There are three types of conventional assembled structures of a handlebar stem assembly and a fork for a bicycle substantially as stated below.

(I) A steer tube is provided with male threads and a cap of an upper bearing assembly has female threads cooperating with the male threads of the steer tube. A nut with female threads is placed on a top end of the cap of the upper bearing assembly. By means of the two elements with female threads urging each other, the bearing assembly is prevented from loosening. The handlebar stem is inserted into the steer tube without forcing the bearing assembly or nut.

(II) A steer tube is provided with male threads and two nuts having female threads mating with the male threads of the steer tube are mounted on a top end of a cap of an upper bearing assembly. The bearing assembly is prevented from loosening by means of the two nuts urging each other. The handlebar stem is inserted into the steer tube without forcing the bearing assembly or nut.

(III) As disclosed in U.S. Pat. No. 5,095,770, a steer tube 33 is not provided with male threads but has female threads provided on an inner wall of an upper end of the steer tube, and a compression ring 67 has a tapered contact surface 75 which abuts against a tapered contact surface 63 of a second race 59 of the upper bearing assembly 49. Further, a connector 35 is clamped to the steer tube 33 and an adjusting nut 79 having male threads 81 is engaged with the upper end of the steer tube to form a forcing element to force the connector 35 downward such that the bearing assemblies can be secured.

The aforesaid three conventional structures have the following drawbacks:

In structures (I) and (II), since the steer tubes need to be machined to obtain male threads and the structures also need two large nuts such that the manufacturing cost is increased and the strength of the wall of the steer tube having threads is decreased. Further, in assembling and adjusting, wrenches of large dimension are needed, which can only be operated by skilled persons (such as workmen in bicycle stores).

In structure (III): it needs a lot of work of welding and machining and thus the manufacturing cost is high. Further, it needs special tools to connect the upper end of the steer tube with the adjuster nut, which causes the difficulty in assembling and repairing.

SUMMARY OF THE INVENTION

For overcoming the aforesaid drawbacks, the inventor of this invention provides an improved assembled structure of a handlebar stem assembly and a fork of a bicycle in which the handlebar stem assembly is inserted into a steer tube; the handlebar stem of the handlebar stem assembly is provided with a step which abuts against a pressure adjuster on the top end surface of the steer tube such that the pressure adjuster exerts a downward force. Further, a tongue-shaped tube is provided below the handlebar stem and has a tapered contact surface on the top end thereof for cooperating with a tapered contact surface provided at the bottom of the handlebar stem. The bottom of the tongue-shaped tube is provided with a thread hole such that in assembling the handlebar stem into the steer tube, an adjusting bolt can be threaded into the tongue-shaped tube by passing the bolt through the handlebar stem and when tightening the adjusting bolt, by means of relative movement between the cooperative tapered contact surfaces of the handlebar stem and tongue-shaped tube, the outer sides of the handlebar stem and the tongue-shaped tube abut against the inner wall of said steer tube in order to secure said handlebar stem to steer tube and obtain axial and radial positioning of the handlebar stem.

The handlebar stem of the aforesaid structure of this invention may have no step but has threads provided at the appropriate positions thereon for engaging with a locking nut such that in assembling the handlebar stem into the steer tube, the locking nut can abut against the pressure adjuster and functions as the step.

Further, the lower end of the tongue-shaped tube can be provided with an annular groove for receiving an O-shaped ring such that there is resistance produced between the tongue-shaped tube and the steer tube in order to decrease a gap existing in the bearing assembly since a downward force can be produced during the securing of the handlebar stem.

According to the structure of this invention, there are the following advantages: (1) since the threads and welding spots of the handlebar stem are lesser, the manufacture of this invention is easier and the manufacturing cost is lower; (2) since the handlebar stem is inserted into the steer tube, the steer tube does not need to project out of the head tube too much, and thus the length of the steer tube can be shorter than that of the steer tube of the aforesaid conventional Structure (III); (3) in this invention, it is not necessary to use wrenches of large dimension as used in the aforesaid conventional Structures (I) and (II) or special tools as used in the aforesaid conventional Structure (III) for connecting the adjusting nut with the upper end of the steer tube, and only ordinary Allen wrenches are needed in assembling and adjusting; and (4) since the welding spots and machined spots of the handlebar stem and steer tube are minimized, the strength of the structure of this invention is greatly increased.

BRIEF DESCRIPTION OF THE DRAWINGS

The detailed content of this invention will be further explained by referring to the accompanying drawings.

DETAILED DESCRIPTION OF THE INVENTION

Figure 1:
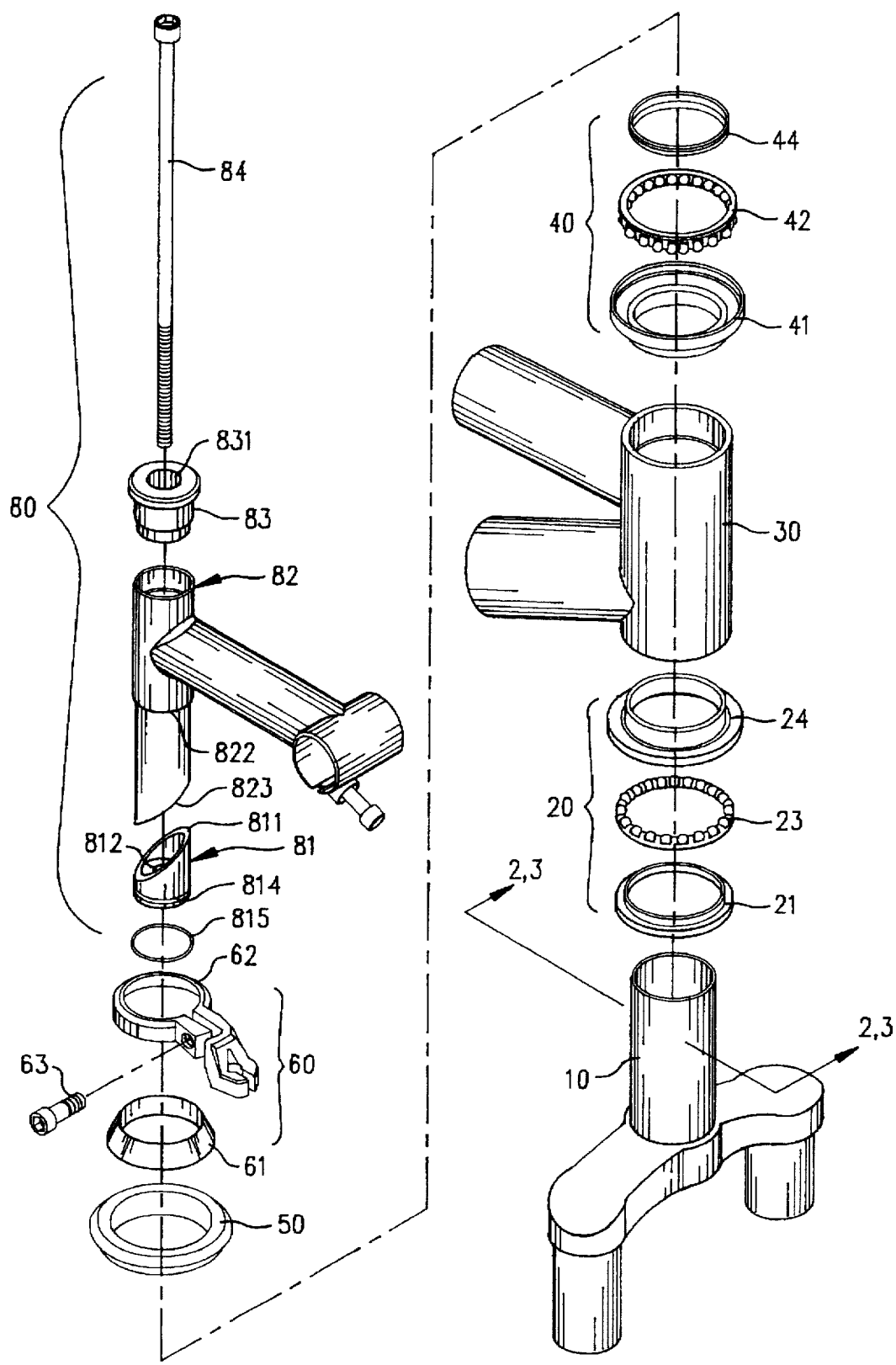
FIG. 1 is an exploded perspective view of a first embodiment of this invention.
Figure 2:
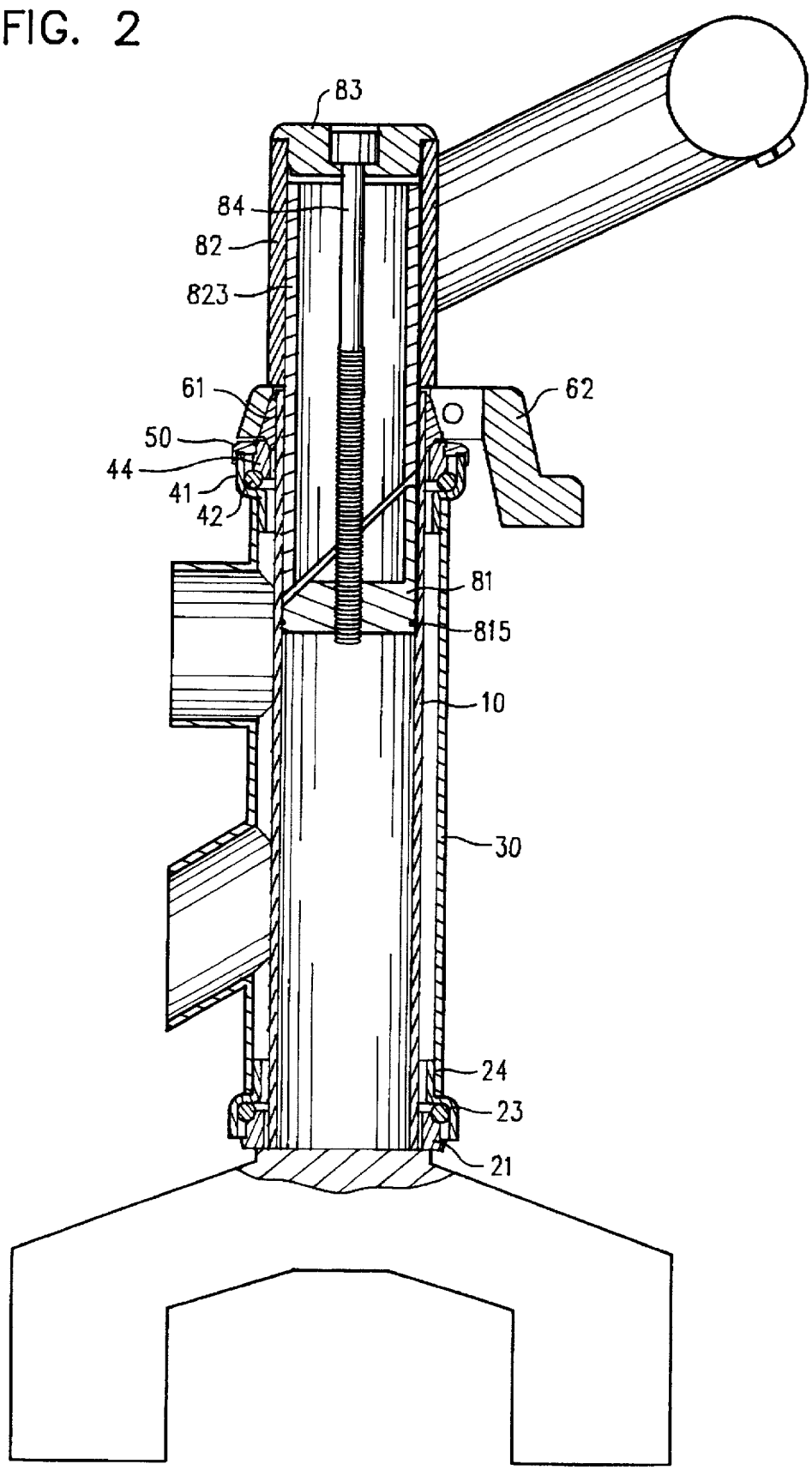
FIG. 2 is a sectional view of the structure of FIG. 1 after being assembled, in which the adjusting bolt of the handlebar stem assembly has not yet been tightened.

Please refer to FIGS. 1 and 2. An assembled structure of a handlebar stem assembly and a fork of this invention mainly includes a steer tube 10, a lower bearing assembly 20, a head tube 30, an upper bearing assembly 40, a water-proof ring 50, a pressure adjuster assembly 60, and a handlebar stem assembly 80. The assembled structure of the handlebar stem assembly and the fork and the assembling manner will be detailed explained hereinafter.

The lower bearing assembly 20 comprises a crown race 21, a bearing retainer 23 and a lower cup 24 which are sequentially mounted at a lower end of the steer tube 10.

The steer tube 10 passes through the head tube 30 from a bottom thereof and projects a little out of a top end of the head tube 30.

The upper bearing assembly 40 comprises a upper cup 41, a bearing retainer 42 and a race 44 which are sequentially mounted on the top end of head tube 30. The water-proof 50 and the pressure adjuster assembly 60 including a compression ring 61 having a gap and a pressure adjuster 62 are also sequentially mounted on the upper bearing assembly 40.

It should be explained here that the steer tube 10, lower bearing assembly 20, head tube 30, upper bearing assembly 40, water-proof ring 50, compression ring 61 and pressure adjuster 62 are conventional elements used in bicycles, and thus the descriptions of these elements are omitted here.

The handlebar stem assembly 80 includes a tongue-shaped tube 81, a handlebar stem 82, a top cap 83 and an adjusting bolt 84. The top cap 83 having a central throughhole 831 is mounted on a top end of the handlebar stem 82. At an appropriate position on the handlebar stem 82, a step 822 is formed and a bottom of the handlebar stem 82 is provided with a tapered contact surface 823. The tongue-shaped tube 81 is placed below the handlebar stem 82 and its top end has a tapered contact surface 811 cooperating with the tapered contact surface 823. The bottom of the tongue-shaped tube 81 is provided with a threaded hole 812 and a lower end of the tongue-shaped tube 81 has an annular groove 814 for receiving an O-shaped ring 815. By passing the adjusting bolt 84 through the central throughhole 831 of the top cap 83, the handlebar stem 82, and the tongue-shaped tube 81, the adjusting bolt is threaded into the threaded hole 812 of the tongue-shaped tube 81 while not being tightened, thereby the handlebar stem assembly can be assembled. Subsequently, the assembled handlebar stem assembly is inserted into the steer tube 10 through the pressure adjusting 62 until the step 822 of the handlebar stem 82 abuts against the pressure adjusting 62, and the adjusting bolt 84 then can be tightened. At this time, the tapered contact surface 811 of the tongue-shaped tube 81 will move relative to the tapered contact surface 823 of the handlebar stem 82 such that the outer sides of the handlebar stem 82 and the tongue-shaped tube 81 abut against the inner wall of the steer tube 10 whereby the handlebar stem 82 can be positioned in and secured to the steer tube 10 (please refer to FIG. 3). Finally, the pressure adjusting 62 is locked by tightening a bolt 63 to complete the assembling of the structure of this invention.

Further, due to the tightening of the adjusting bolt 84, the step 822 can tightly abut against the pressure adjuster 62 such that the pressure adjuster 62 produce a downward force to secure the upper bearing assembly 40 in an accurate position. In addition, since the tongue-shaped tube 81 has an O-shaped ring at the lower end thereof, the resistance can be produced between the tongue-shaped tube 81 and the steer tube 10 such that a downward force can be produced during the securing of the handlebar stem in order to decrease the gap existing in the bearing assembly.

If the height of the handlebar stem 82 is to be adjusted, users should first unscrew the adjusting bolt 84 and bolt 63, after pulling the handlebar stem 82, place a washer or washers (not shown) on the pressure adjuster 62 in order to obtain desired height of the handlebar stem 82, and then screws the adjusting bolt (84) and bolt 63.

Figure 3:
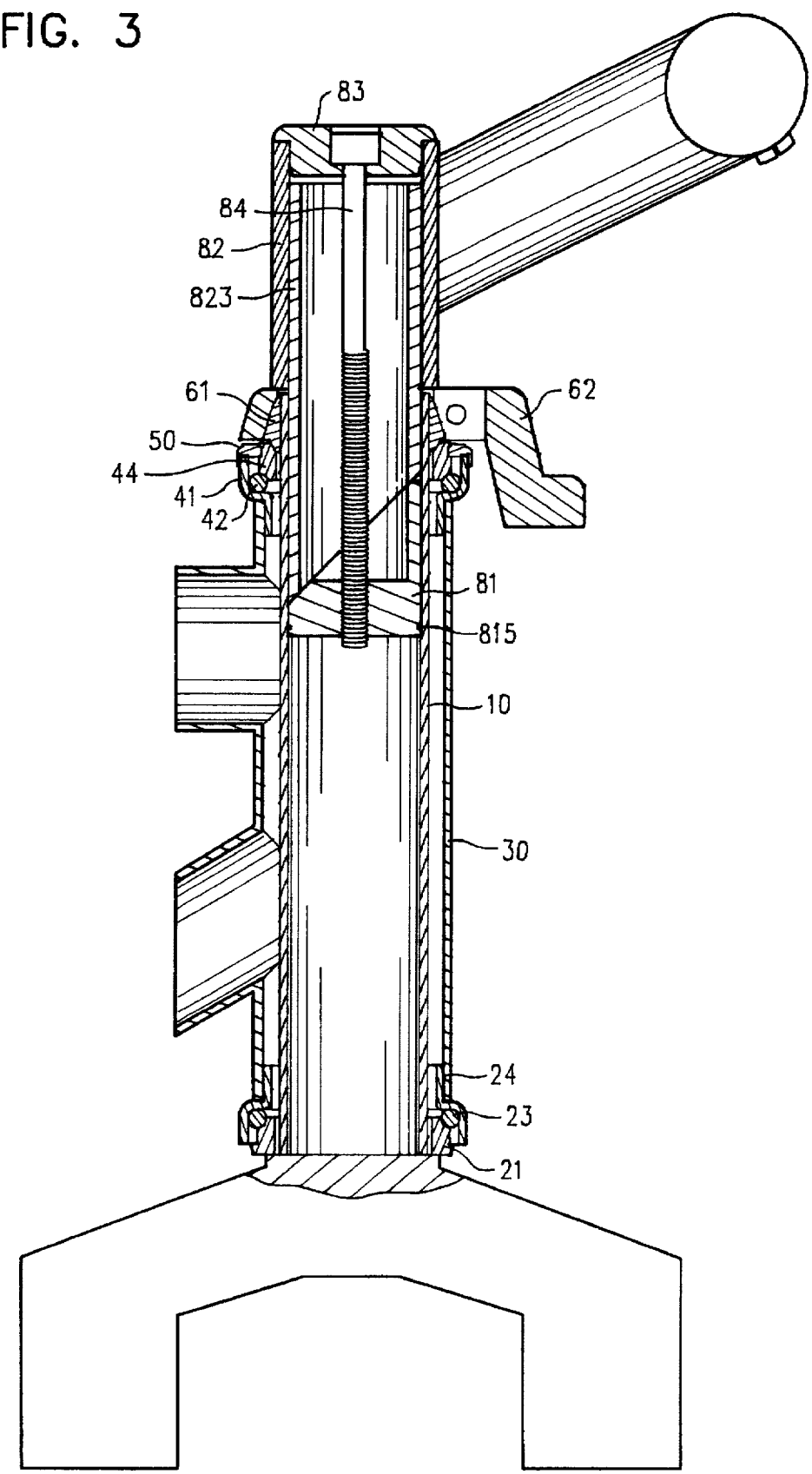
FIG. 3 is a sectional view of the structure of FIG. 1 after being assembled, in which the adjusting bolt of the handlebar stem assembly has been tightened.
Figure 4:
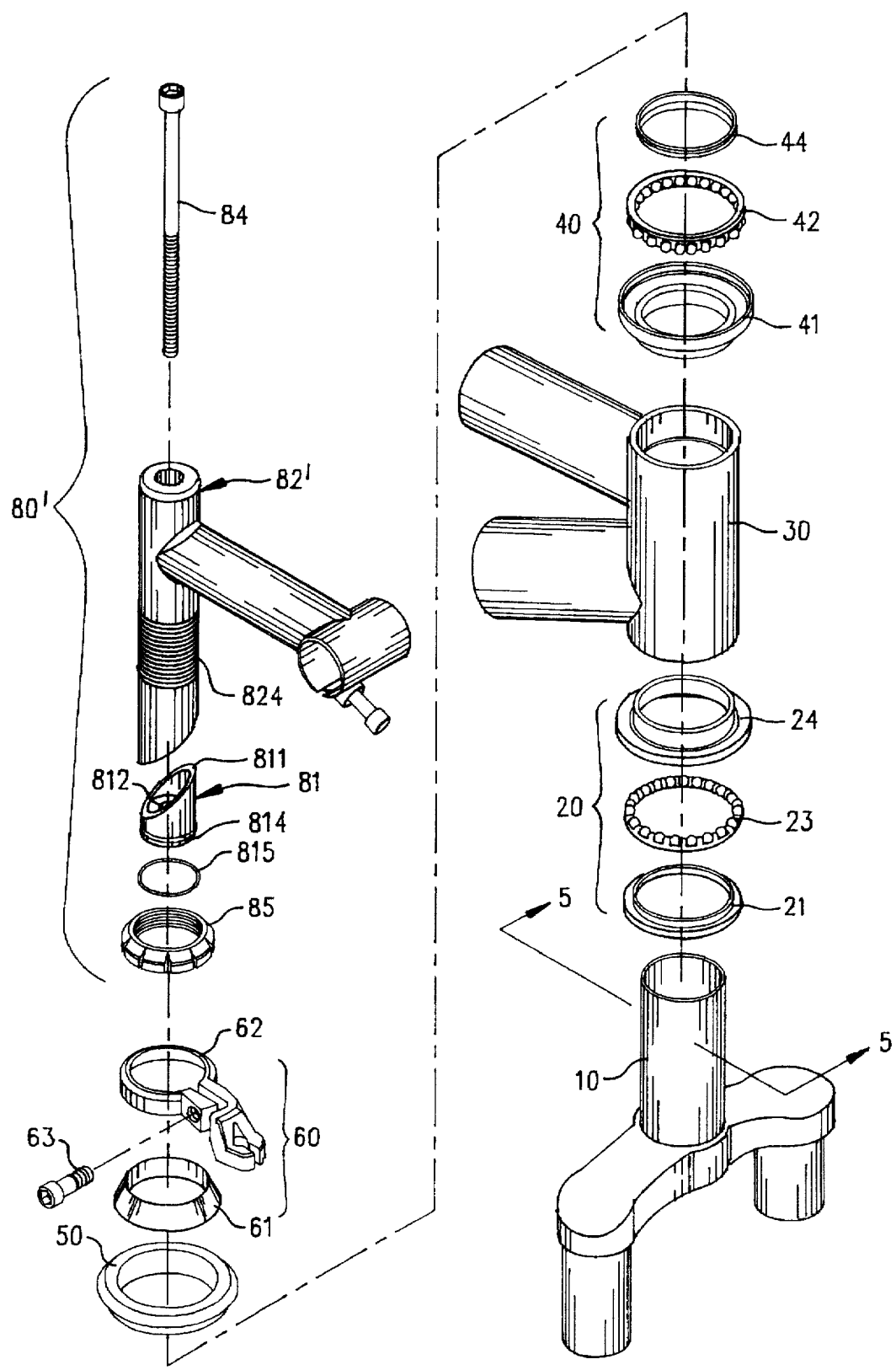
FIG. 4 is an exploded perspective view of a second embodiment of this invention.
Figure 5:
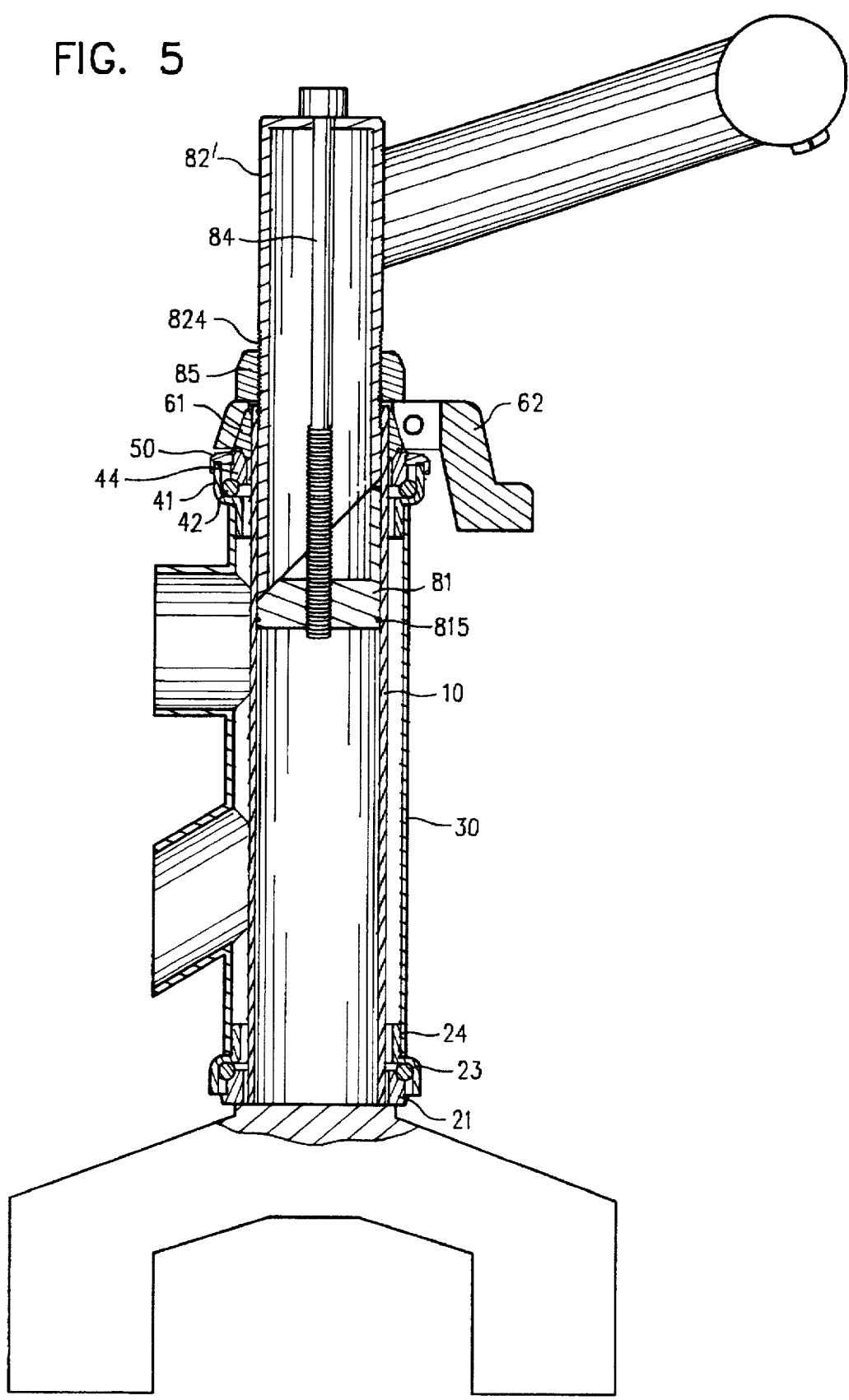
FIG. 5 is a sectional view of the structure of FIG. 4 after being assembled.

Please refer to FIGS. 4 and 5 which show the second embodiment of the assembled structure of the handlebar stem assembly and the fork of this invention, The structure shown in FIGS. 4 and 5 is similar to the structure shown in FIG. 1 except that the handlebar stem assembly is somewhat different from that shown in FIG. 1. Hence, only the handlebar stem assembly of the second embodiment is explained hereinafter. The handlebar stem assembly 80' comprises a locking nut 85, a tongue-shaped tube 81, a handlebar stem 82' and an adjusting bolt 84. When compared with the handlebar stem assembly 80 shown in FIG. 1, it can be found that the handlebar stem 82' does not have a step 822 but has threads 824 provided on the appropriate positions on the surface of the handlebar stem 82' for being engaged with the locking nut 85. The function of locking nut 85 is similar to that of step 822 of the handlebar stem 82 as shown in FIGS. 1–3. Similar to the assembling manner of the structure of FIG. 1, the adjusting bolt 84 is passed through the handlebar stem 82' and engaged with the tongue-shaped tube 81 while the locking nut 85 is threadedly connected with the threads 824 of the handlebar stem 82' in order to assemble the handlebar stem assembly 80'. Subsequently, the assembled handlebar stem assembly 80' is inserted into the steer tube 10 through the pressure adjuster 62 until the locking nut 85 abuts against the pressure adjuster 62. Finally, the locking nut 85 is tightened and in turn, the adjusting bolt 84 and the bolt 63 for pressure adjuster 62 are also tightened to complete the assembling of the structure of FIG. 4.

If the height of the handlebar stem 82' of FIG. 4 is to be adjusted, users can finely adjust the height of the handlebar stem 82 by means of locking nut 85 without using the washers as used in the structure of FIG. 1.

It will thus be seen that the objects set forth above, among those made apparent from the preceding description are efficiently attained and, since certain changes may be made in carrying out the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

I claim:

1. In a handlebar stem assembly and a fork of a bicycle having a steer tube, a lower bearing assembly, a head tube, an upper bearing assembly, a water-proof ring, a pressure adjuster assembly including a pressure adjuster and a compression ring, and a handlebar assembly, the lower bearing assembly being mounted at a bottom of the steer tube which is inserted from a bottom of the head tube into the head tube, the upper bearing assembly, the water-proof ring and the pressure adjuster assembly being sequentially mounted on a top end of the head tube, and the handlebar stem assembly being inserted into the steer tube from a top end of the pressure adjuster, the improvement comprising:

the handlebar stem assembly including a handlebar stem, a top cap having a central throughhole and being mounted at a top end of the handlebar stem, a tongue-shaped tube disposed below the handlebar stem, and an adjusting bolt, the handlebar stem having a bottom, the bottom of the handlebar stem having a contact surface, the tongue-shaped tube having a top end with a contact surface that abuts the contact surface of the handlebar stem, the tongue-shaped tube having a bottom end with a hole therein for passage of the adjusting bolt from the top cap central throughhole, through the handlebar stem and into the hole of the bottom end of the tongue-shaped tube, the tongue-shaped tube having a ring therearound to produce resistance between the tongue-shaped tube and the steer tube.

2. The improvement of claim 1, wherein the handlebar stem has a step thereon that abuts the pressure adjuster.

3. The improvement of claim 1, wherein the tongue-shaped tube has a groove in which the ring resides.

4. In a handlebar stem assembly and a fork of a bicycle having a steer tube, a lower bearing assembly, a head tube, an upper bearing assembly, a water-proof ring, a pressure adjuster assembly including a pressure adjuster and a compression ring, and a handlebar assembly, the lower bearing assembly being mounted at a bottom of the steer tube which is inserted from a bottom of the head tube into the head tube, the upper bearing assembly, the water-proof ring and the pressure adjuster assembly being sequentially mounted on a top end of the head tube, and the handlebar stem assembly being inserted into the steer tube from a top end of the pressure adjuster, the improvement comprising:

the handlebar stem assembly including a handlebar stem, a top cap having a central throughhole and being mounted at a top end of the handlebar stem, a tongue-shaped tube disposed below the handlebar stem, and an adjusting bolt, the handlebar stem having a step thereon that abuts the pressure adjuster and having a bottom, the bottom of the handlebar stem having a contact surface, the tongue-shaped tube having a top end with a contact surface that abuts the contact surface of the handlebar stem, the tongue-shaped tube having a bottom end with a hole therein for passage of the adjusting bolt from the top cap central throughhole, through the handlebar stem and into the hole of the bottom end of the tongue-shaped tube, the tongue-shaped tube having a ring therearound to produce resistance between the tongue-shaped tube and the steer tube.

5. The improvement of claim 4, wherein the tongue-shaped tube has a groove in which the ring resides.

6. In a handlebar stem assembly and a fork of a bicycle having a steer tube, a lower bearing assembly, a head tube, an upper bearing assembly, a water-proof ring, a pressure adjuster assembly including a pressure adjuster and a compression ring, and a handlebar assembly, the lower bearing assembly being mounted at a bottom of the steer tube which is inserted from a bottom of the head tube into the head tube, the upper bearing assembly, the water-proof ring and the pressure adjuster assembly being sequentially mounted on a top end of the head tube, and the handlebar stem assembly being inserted into the steer tube from a top end of the pressure adjuster, the improvement comprising:

the handlebar stem assembly including a handlebar stem, a top cap having a central throughhole and being mounted at a top end of the handlebar stem, a tongue-shaped tube disposed below the handlebar stem, and an adjusting bolt, the handlebar stem having a step thereon that abuts the pressure adjuster and having a bottom, the bottom of the handlebar stem having a contact surface, the tongue-shaped tube having a top end with a contact surface that abuts the contact surface of the handlebar stem, the tongue-shaped tube having a bottom end with a hole therein for passage of the adjusting bolt from the top cap central throughhole, through the handlebar stem and into the hole of the bottom end of the tongue-shaped tube.

7. The improvement of claim 6, wherein the tongue-shaped tube has a ring therearound to provide resistance between the tongue-shaped tube and the steer tube.

8. The improvement of claim 7, wherein the tongue-shaped tube has a groove in which the ring resides.

9. In a handlebar stem assembly and a fork of a bicycle having a steer tube, a lower bearing assembly, a head tube, an upper bearing assembly, a water-proof ring, a pressure adjuster assembly including a pressure adjuster and a compression ring, and a handlebar assembly, the lower bearing assembly being mounted at a bottom of the steer tube which is inserted from a bottom of the head tube into the head tube, the upper bearing assembly, the water-proof ring and the pressure adjuster assembly being sequentially mounted on a top end of the head tube, and the handlebar stem assembly being inserted into the steer tube from a top end of the pressure adjuster, the improvement comprising:

the handlebar stem assembly including a handlebar stem, a top cap having a central throughhole and being mounted at a top end of the handlebar stem, a tongue-shaped tube disposed below the handlebar stem, and an adjusting bolt, the handlebar stem having a step thereon that abuts the pressure adjuster and having a bottom, the bottom of the handlebar stem having a contact surface, the tongue-shaped tube having a top end with a contact surface that abuts the contact surface of the handlebar stem, the tongue-shaped tube having a bottom end with a hole therein for passage of the adjusting bolt from the top cap central throughhole, through the handlebar stem and into the threaded hole of the bottom end of the tongue-shaped tube, the tongue-shaped tube having a groove with a ring therein to produce resistance between the tongue-shaped tube and the steer tube.

* * * * *

UNITED STATES PATENT AND TRADEMARK OFFICE
CERTIFICATE OF CORRECTION

PATENT NO. : 5,680,798
DATED : October 28, 1997
INVENTOR(S) : C.S. Luen

It is certified that error appears in the above-identified patent and that said Letters Patent is hereby corrected as shown below:

| COLUMN | LINE | |
|---|---|---|
| 6 (Claim 6, | 3 line 5) | "beating" should read --bearing-- |

Signed and Sealed this

Twenty-fourth Day of February, 1998

Attest:

BRUCE LEHMAN

Attesting Officer     Commissioner of Patents and Trademarks